(12) United States Patent
Perrochon et al.

(10) Patent No.: US 8,315,919 B1
(45) Date of Patent: Nov. 20, 2012

(54) DISTRIBUTED ELECTRONIC COMMERCE SYSTEM WITH MERCHANT BIDDING FOR SALES OF ITEMS

(75) Inventors: Louis Perrochon, Moutain View, CA (US); Arturo Crespo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1356 days.

(21) Appl. No.: 11/840,527

(22) Filed: Aug. 17, 2007

(51) Int. Cl.
*G06Q 30/00* (2006.01)
(52) U.S. Cl. .................................... 705/26.41
(58) Field of Classification Search ................. 705/26.1, 705/26.41
See application file for complete search history.

(56) References Cited

U.S. PATENT DOCUMENTS

| | | | |
|---|---|---|---|
| 5,794,207 A | 8/1998 | Walker et al. | |
| 5,897,620 A | 4/1999 | Walker et al. | |
| 5,966,967 A * | 10/1999 | Agrawal et al. | 62/650 |
| 6,085,169 A | 7/2000 | Walker et al. | |
| 6,141,653 A | 10/2000 | Conklin et al. | |
| 6,260,024 B1 * | 7/2001 | Shkedy | 705/37 |
| 6,510,418 B1 | 1/2003 | Case et al. | |
| 6,553,346 B1 | 4/2003 | Walker et al. | |
| 6,754,636 B1 | 6/2004 | Walker et al. | |
| 6,873,968 B2 * | 3/2005 | Ehrlich et al. | 705/80 |
| 6,876,983 B1 | 4/2005 | Goddard | |
| 6,934,690 B1 | 8/2005 | Van Horn et al. | |
| 7,120,595 B2 * | 10/2006 | Alexander | 705/26.64 |
| 7,222,089 B2 * | 5/2007 | Harpale | 705/26.2 |
| 7,272,571 B2 * | 9/2007 | Tuttrup et al. | 705/22 |
| 7,617,128 B2 * | 11/2009 | Greak | 705/26.35 |
| 7,853,482 B2 * | 12/2010 | Kiefer et al. | 705/26.8 |
| 2002/0178074 A1 | 11/2002 | Bloom | |
| 2003/0171995 A1 * | 9/2003 | Dezonno et al. | 705/26 |
| 2007/0299736 A1 * | 12/2007 | Perrochon et al. | 705/26 |

OTHER PUBLICATIONS

Manor, Robert, "Gavel to fall on electric rates; little used re4verse auction for buying power expected to boost volatility and bills of consumers throughout Illinois", Chicago Tribune, Jan. 26, 2006.*
Emiliani et al, "Aerospace parts suppliers' reaction to online reverse auctions", Supply Chain Management, 2004.*
"HedgeHog.com—Online Reverse Auction Services: On Demand B2B . . . " [online] [Retrieved Dec. 5, 2006] Retrieved from the Internet<URL:http://www.hedgehog.com/onlinereverseauctions.htm>.
"Reverse Auction—Wikipedia, the free encyclopedia," Dec. 4, 2006, Wikipedia Foundation, Inc., [online] [Retrieved on Dec. 5, 2006] Retrieved from the Internet<URL:http://en.wikipedia.org/wiki/Reverse_auction>.

(Continued)

*Primary Examiner* — Mark Fadok
(74) *Attorney, Agent, or Firm* — Fenwick & West LLP (57) ABSTRACT

An electronic commerce system includes a broker that enables customers to purchase an item from a merchant, where one or more merchants provide bids to sell the item to the customer. In one embodiment, the broker can sell the item to the customer for a defined price determined based on pricing criteria, and then accept bids from merchants offering the item for sale to select a merchant to provide the item based on selection criteria. In another embodiment, the bidding is done in real time before the item is sold to the customer. The broker selects a merchant out of the merchants providing bids, and the broker quotes a price to the customer. Once the customer has agreed to pay the price, the broker can sell the item to the customer. The broker manages the completion of the transaction and payment of the merchant.

26 Claims, 5 Drawing Sheets

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>; <http://shopatron.ooi.net/checkout1.phtml>; <http://shopatron.ooi.netlcheckout3.phtml?multi=>;<http://shopatron.ooi.netlcheckout4.phtml>.

* cited by examiner

DISTRIBUTED ELECTRONIC COMMERCE SYSTEM WITH MERCHANT BIDDING FOR SALES OF ITEMS

CROSS-REFERENCE TO RELATED APPLICATIONS

This application is related to U.S. patent application Ser. No. 11/112,176, filed Apr. 22, 2005, entitled "Distributed Electronic Commerce System With Centralized Point Of Purchase," to U.S. patent application Ser. No. 11/299,168, filed on Dec. 29, 2005, entitled "Distributed Electronic Commerce System with Centralized Virtual Shopping Carts," and to U.S. patent application Ser. No. 11/477,012, filed on Jun. 27, 2006, entitled "Distributed Electronic Commerce System with Independent Third Party Virtual Shopping Carts," which are hereby incorporated by reference herein in their entireties, including any appendices or attachments thereof, for all purposes.

BACKGROUND

This invention pertains in general to electronic commerce and in particular to a system for shopping from Internet-based merchants where the merchants bid to provide items to customers.

Electronic commerce on the Internet has become commonplace. There are many merchants offering goods and services via web sites on the Internet, and there are an even greater number of customers who purchase the goods and services. In many cases, the electronic commerce transactions involve physical goods. For example, many customers purchase items such as books, compact disks (CDs) and DVDs via the Internet. Customers can also purchase electronic content such as downloadable text and/or music and access to web sites that provide news or entertainment stories.

Most electronic commerce sites on the Internet use ad hoc purchasing systems. For example, a web-based music merchant typically has a purchasing system that is valid for only that merchant's family of web sites. Therefore, a customer must establish an account and/or provide payment information to each merchant that the customer patronizes. These separate accounts are inconvenient to both parties. The merchant must maintain a dedicated account management and payment system. The customer must establish separate accounts with numerous merchants.

Due to these inconveniences, customers are often reluctant to purchase items from smaller or relatively unknown merchants. These merchants lack the brand recognition and trust associated with larger, better known merchants. Therefore, the customers hesitate to engage in risky behavior, such as providing a credit card number or shipping address, to the merchants.

Furthermore, where a customer is interested in purchasing a particular product, the customer must spend time determining which merchants are selling the product to obtain the best price, highest quality product, best shipping options, best return policy, etc. Before being willing to provide personal information to the merchant, the customer may further spend time researching the reliability of the particular merchant to find the merchant with the best reputation, and who is unlikely to share personal information. Thus, the customer may invest a substantial amount of time to explore various merchants that might be selling the product. In addition, the customer has no reasonable way to negotiate with these various merchants selling the product in the hopes of obtaining a more favorable price.

In a reverse auction, a buyer can issue a request for quotation to purchase a good or service and can receive several quotes over a period of time from various merchants interested in selling the good/service to the buyer, where the quotes indicate the prices at which the merchants are willing to sell the good/service. However, the customer often must work with an auction provider or service that can provide the necessary software and know-how to arrange such an auction. The customer may be required to set up an account, acquire certain software, have some knowledge about conducting auctions before any purchase can be made, and so forth. The average customer wishing to make a purchase cannot easily just make a request for a good/service, and have the good/service be provided for a good price and reasonable terms without further effort on the part of the customer. In addition, if the customer successfully conducts the auction, the customer typically still must review the resulting offers provided by the merchants. This can require a good deal of the customer's time and further require that the customer have knowledge about what offers are worth accepting and the value of the good/service desired.

As a result, there is a need in the art for an electronic commerce system that allows customers to be able to purchase a product from a reliable merchant with favorable purchasing details and at a reasonable price, without requiring the customer to invest a substantial amount of time in the purchase transaction.

SUMMARY

The above need is met by an electronic commerce system that, in one embodiment, includes a purchase request module for receiving a request from a customer to purchase an item. A pricing module can determine the defined price at which to offer the item(s) to the customer based on one or more pricing criteria. For example, the price can be set based on the price at which the merchant is offering the item, based on what the pricing module determines to be a reasonable price, based on pricing data collected by the pricing module, and so forth. A transaction module can sell the item to the customer for the defined price. In some embodiments, a bid management module accepts one or more bids from one or more merchants to sell the item to the customer, wherein the one or more merchants offer the item for one or more prices. In some embodiments, a merchant selection module selects a chosen merchant out of the one or more merchants based on one or more selection criteria to sell the item to the customer. Selection criteria can include the price of the item, quality of the item, reliability of merchant, shipping time, shipping costs, return policy, privacy policy, taxes, shipping methods, agreed-upon merchant fees, customer preference, and so forth.

In another embodiment, the electronic commerce system includes a purchase request module for receiving a request from a customer to purchase an item when the customer selects the item displayed on a merchant's website and is transferred to the broker for management of a transaction associated with the item. In some embodiments, a bid management module accepts bids in real time from one or more merchants for selling the item to the customer, wherein the one or more merchants offer the item for one or more prices. In some embodiments, a merchant selection module selects a chosen merchant out of the one or more merchants based on one or more selection criteria, such as those stated above, to sell the item to the customer, the chosen merchant offering a selling price for the item. In some embodiments, a pricing module quotes to the customer a quoted price for purchasing the item by the chosen merchant for the item.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

A. Overview

Figure 1:
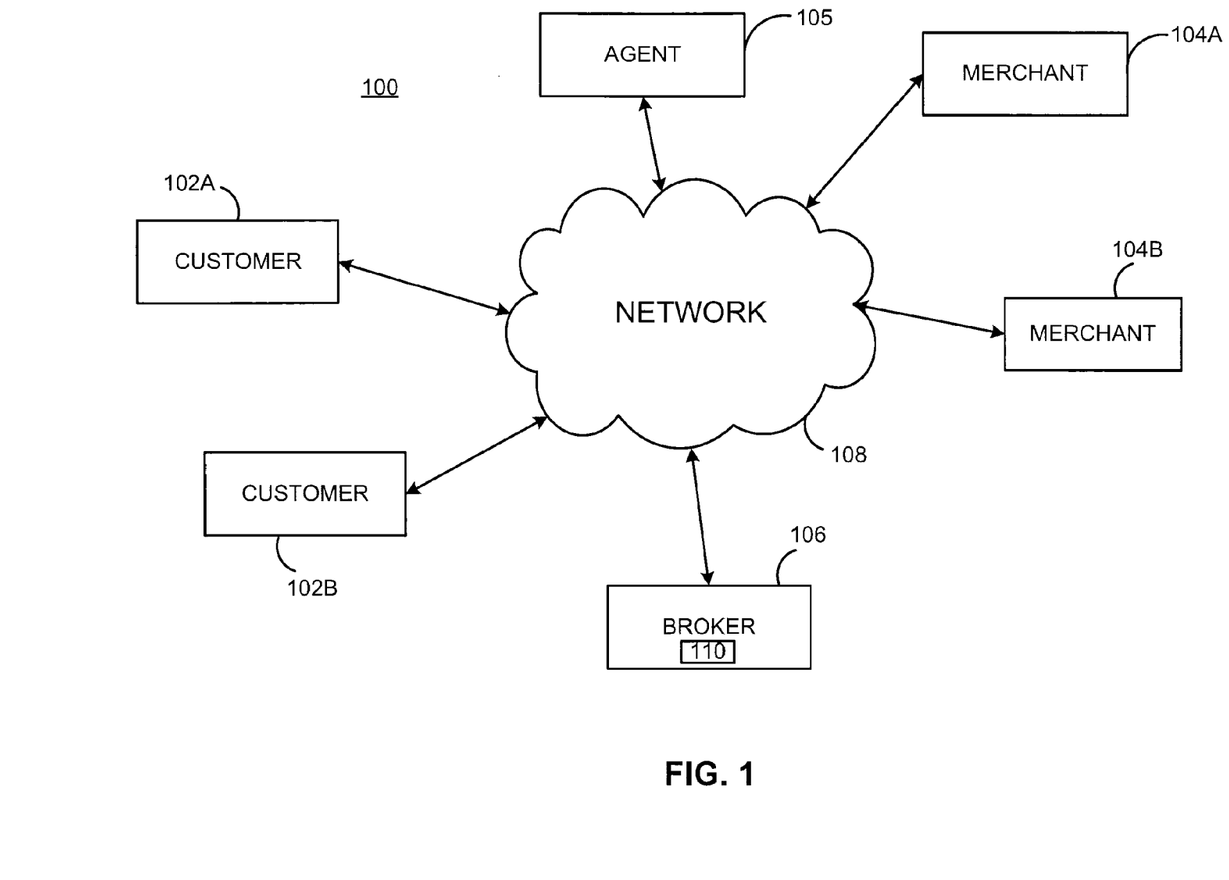
FIG. 1 is a high-level block diagram of a computing environment according to one embodiment.

FIG. 1 is a high-level block diagram of a computing environment 100 according to one embodiment of the present invention. FIG. 1 illustrates two customers 102A and 102B, two merchants 104A and 104B, an agent 105, and a broker 106 connected by a network 108. FIG. 1 and the other figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A" and/or "104B" in the figures).

The customer 102 in this embodiment represents an entity that obtains items via the network 108 through purchases or other types of transactions. The customer 102 is sometimes referred to as the "buyer," the transaction is sometimes referred to as a "sale" or "purchase," and the item being purchased is sometimes referred to as a "product." As used herein, these terms also refer to other types of transactions, regardless of whether the customer is technically a "buyer" or the transaction is technically a "purchase" (e.g., transactions in which no money is exchanged). End-users acting as customers 102 can include end-users purchasing items for their own use or as gifts, and/or end-users purchasing products for the use of a company or other enterprise with which the end-users are associated, or for other purposes.

In one embodiment, the customer 102 includes a computer system utilized by an end-user to communicate with other computers on the network 108 in order to effect a purchase. The computer system, for example, can be a personal computer executing a web browser such as MICROSOFT INTERNET EXPLORER that allows the end-user to retrieve and display content from web servers and other computer systems on the network 108. In other embodiments, the customer 102 includes a network-capable device other than a computer system, such as a personal digital assistant (PDA), a cellular telephone, a pager, a smartphone, a television "set-top box" etc. Although FIG. 1 illustrates two customers 102, embodiments of the present invention can have thousands or millions of customers participating in the electronic commerce system described herein. Only two customers 102 are illustrated in order to simplify and clarify the present description.

Similarly, the merchant 104 represents an entity that sells items on the network 108 or makes items available through other types of transactions. The merchant 104 offering the item to the buyer is sometimes referred to as the "seller" and the transaction is sometimes referred to as a "sale" or "purchase." As used herein, these terms also refer to other types of transactions, regardless of whether the merchant is technically a "seller" or the transaction is technically a "sale."

In one embodiment, the merchant 104 includes a computer system acting as a web server that is utilized to offer the items to potential customers 102. The merchant 104 is said to be "online," meaning that the merchant 104 provides a presence on the network 108. The items offered by the merchant 104 can include tangible items such as books, CDs, DVDs, digital cameras, movies, clothing, toys, automobiles, electronics, household products, and so forth. The items offered by the merchant 104 can also include intangible items such as services and electronic content such as web pages, downloadable files, streaming media, etc. Although FIG. 1 illustrates only two merchants 104, embodiments of the present invention can have many merchants participating in the electronic commerce system. The two merchants 104 are illustrated in order to simplify and clarify the present description.

The broker 106 represents an entity that serves as an intermediary for the transaction between the customer(s) 102 and the merchant(s) 104. In one embodiment, the broker 106 operates a system that functions as a centralized place at which a customer 102 can be directed for a bidding and checkout process for one or more items to be purchased. Although FIG. 1 illustrates only a single broker 106, embodiments of the present invention can have multiple brokers participating in the electronic commerce system. In some embodiments, a customer 102 may be interested in purchasing a virtual shopping cart containing various items. Such a shopping cart can be created, for example, via the broker 106 where the cart is stored with the broker 106 and the broker 106 manages the checkout/payment process. This shopping cart creation and management via the broker 106 is described in detail in U.S. patent application Ser. No. 11/299,168, filed on Dec. 29, 2005, entitled "Distributed Electronic Commerce System with Centralized Virtual Shopping Carts," which is incorporated by reference herein in its entirety for all purposes.

In some embodiments, the computing environment 100 includes an agent 105 that represents an independent, third-party entity that creates and displays on a website or otherwise makes available a virtual shopping cart including items that can be purchased. A customer 102 can indicate that he or she would like to purchase those items (e.g., by selecting a "buy" button, a "purchase" button, a "checkout" button, by clicking on a shopping cart icon, etc.), and the customer 102 can be transferred to the broker 106 for the checkout and payment process. Thus, by acting as an agent 105, a third party (e.g., a customer) can independently create his/her own shopping cart containing any items the third party chooses, manage the cart, share the cart with other users, etc. A single shopping cart or multiple carts can be created to store items being sold by one merchant 104 or by multiple merchants 104 (the same or different merchants). Although FIG. 1 illustrates only one agent 105, embodiments of the present invention can have many agents participating in the electronic commerce system. In some embodiments, the agent 105 is not present and the merchants 104, customers 102 and the broker 106 are the only parties included. The creation and storage of a virtual shopping cart by an agent 105 is described in detail in U.S. patent application Ser. No. 11/477,012, filed on Jun. 27, 2006, entitled "Distributed Electronic Commerce System with Independent Third Party Virtual Shopping Carts," which is incorporated by reference herein in its entirety for all purposes.

FIG. 1 illustrates a commerce control module 110 within the broker 106 that manages the item or items (or shopping cart containing items) for purchase. In some embodiments, the customer 102 identifies to the broker 106 one or more items that the customer 102 would like to purchase. These might be items that the customer 102 located on a merchant's website, on a website managed by the broker 106, on a website managed by a third party (e.g., an agent 105), items that the broker 106 found by searching for an item type/name requested by the customer 102, and so forth The commerce control module 110 within the broker 106 can manage the transaction for the customer 102 by interacting with one or more merchants 104 selling the various items. In some embodiments, the broker 106 accepts one or more bids from the merchants 104 to sell the item or items to the customer 102. The broker 106 can first sell the item(s) of interest to the customer 102 for a price that the broker 106 deems to be a fair price for the item(s), and then the broker 106 can begin accepting bids from the merchants 104 to provide the item to the customer 102. The broker 106 can ultimately select the chosen merchant 104 who will sell the item(s) to the customer, and the broker can pass on to the merchant 104 all or a portion of the money (or additional amounts) the broker 106 received from the customer 102 for the item(s). In other embodiments, the broker 106 can accept bids in real time from the merchants 104 before or as the item(s) are sold to the customer 102. Here, "real time" refers to the accepting of bids before or as the items are sold, and includes processes of accepting bids that might take many seconds or minutes to occur (so are not necessarily instantaneous). The broker 106 can again select the chosen merchant 104 who will sell the item(s) to the customer 102, and the broker 106 can manage the transaction between the customer 102 and merchant 104.

The broker 106 thus manages the transaction and allows even an average, non-sophisticated customer 102 to purchase a good or service for a reasonable price and under reasonable terms, since the broker 106 takes care of managing the negotiations with the merchants 104. The customer 102 can simply indicate an item he is interested in purchasing an item (e.g., from a merchant's website), and the customer 102 can be automatically transferred to the broker 106 for management of that transaction. The broker 106 negotiates with the merchants 104 and collects bids, either real-time or not, and the customer 102 can benefit from these negotiations. The broker 106 selects the chosen merchant for the customer 102 based on various selection criteria (not limited to price) to acquire reasonable terms on the deal. The customer does not have to be involved in conducting a complex auction or spending time reviewing the details of multiple offers. The management of the transaction by the broker 106 (including the bidding process) and the interactions between the broker 106, customer 102, merchant 104, and, where present, agent 105, are described in more detail below.

The network 108 represents the communication pathways between the customers 102, merchants 104, agent 105, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as Ethernet, 802.11, integrated services digital network (ISDN), digital subscriber line (DSL), asynchronous transfer mode (ATM), etc. Similarly, the networking protocols used on the network 108 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

Figure 2:
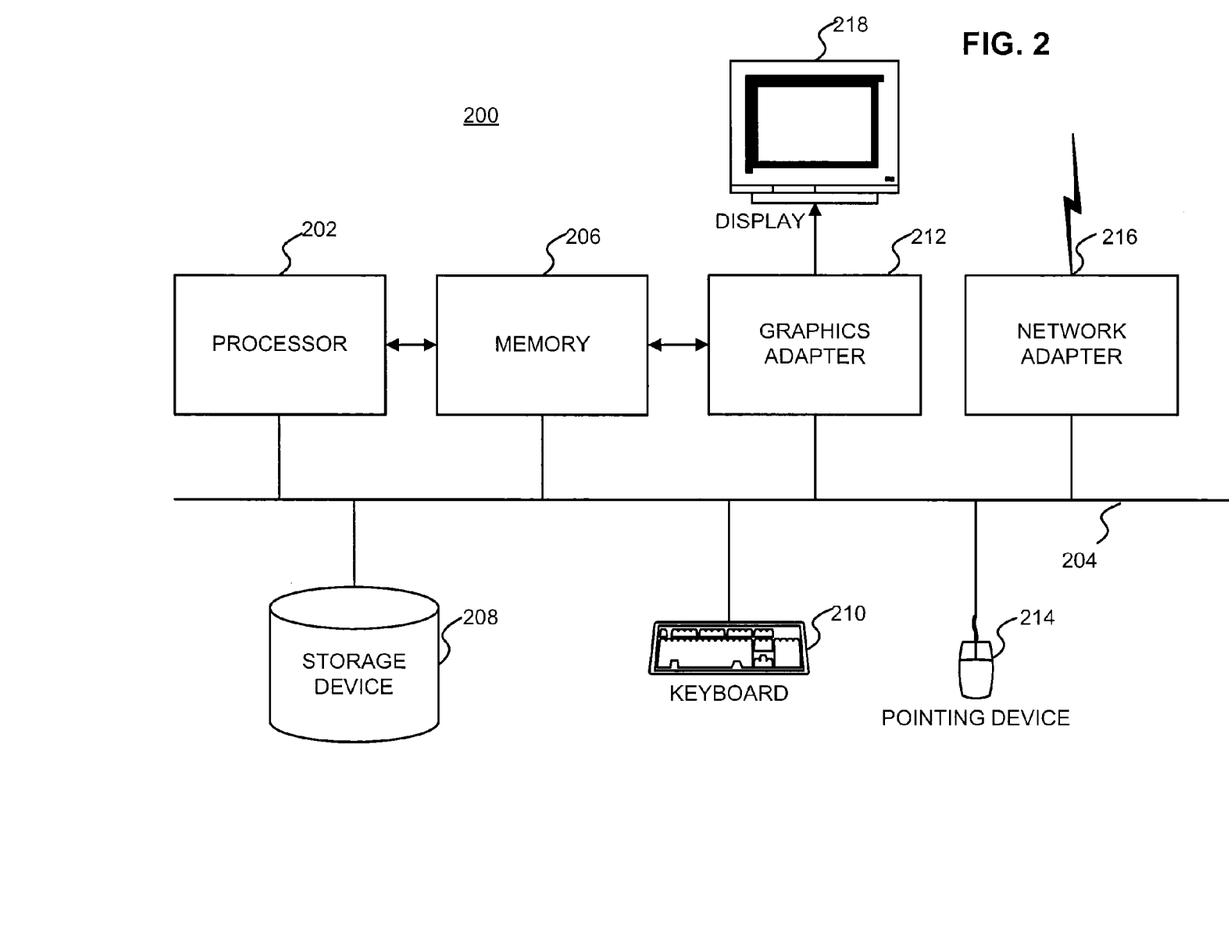
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104, the agent 105 and broker 106. Thus, the customer computer system can be a standard personal computer system. The merchant 104, agent 105, and broker 106 computer systems, in contrast, may comprise more powerful computers and/or multiple computers working together to provide the functionality described herein.

Figure 3:
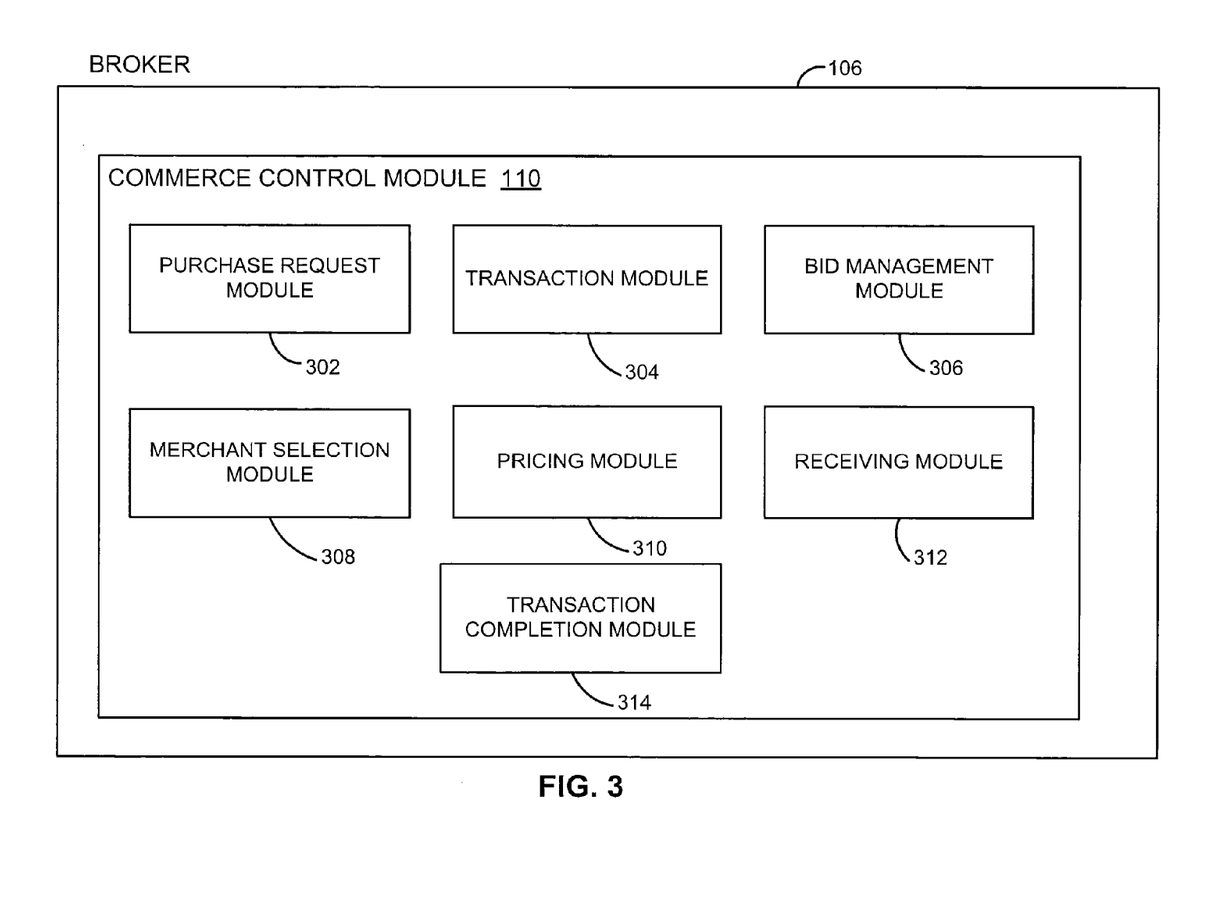
FIG. 3 is a high-level block diagram illustrating modules within a broker according to one embodiment.

FIG. 3 is a high-level block diagram illustrating modules within the commerce control module 110 of the broker 106 according to some embodiments. In some embodiments, the commerce control module 110 includes a purchase request module 302, a transaction module 304, a bid management module 306, a merchant selection module 308, a pricing module 310, a receiving module 312, and a transaction completion module 314. Those of skill in the art will recognize that other embodiments can have different and/or other modules than the ones described here, and that the functionalities can be distributed among the modules in a different manner.

In some embodiments, the purchase request module 302 receives a request from a customer 102 to purchase one or more items. As an example of how the module 302 might receive a request from a customer 102, the customer 102 can select one or more items from a merchant's website for purchase. If the merchant's website is designed to use the broker 106 for the checkout and payment process, the customer 102 can be transferred to the broker's 106 website upon selection of the item(s) and indication of a desire to purchase them. In some embodiments, the customer 102 indicates an interest in purchasing the items by selecting a "buy" button at the merchant's 104 website (or selecting a different button/icon, or otherwise indicating an interest in purchasing the item(s)), which then redirects the customer 102 to the broker 106 for checkout and payment.

As another example of how the purchase request module 302 might receive a request from a customer 102, the customer 102 might purchase items using a "shopping cart" metaphor, so the items the customer 102 identifies might be provided in a virtual shopping cart that the customer 102 created himself or that was created by a third party (e.g., an agent 105). As described above, the shopping cart might be created via the broker 106 and maintained by the broker 106 for the customer 102. In these embodiments, the customer 102 indicates to the broker 106 when he/she is ready to purchase the items in the cart, and the broker 106 manages the transaction. In other embodiments, the shopping is created via the agent 105 and maintained by the agent 105, as described above. In these embodiments, the broker 106 receives from the agent 105 the shopping cart and/or other information regarding the items stored in the cart when the customer 102 indicated he/she would like to purchase the items (e.g., by selecting a "buy" button or otherwise indicating a desire to purchase). Again, the broker 106 manages the transaction. When this description refers to "storing an item in a cart," it should be understood that a virtual representation of the item is actually stored, and not the item itself.

In some embodiments, once the customer 102 has indicated an interest in purchasing one or more items, these one or more items can be sent to the broker 106 for the checkout/payment process (e.g., sent by the merchant 104, by the agent 105, etc.). In other embodiments, the broker 106 is provided with an identifier for or a link to the items (or shopping cart containing the items) by which the module 302 can identify the item(s) of interest. For example, if a customer 102 is interested in purchasing a particular book, the broker 106 can obtain a unique identifier assigned to that book. The identifier can be a merchant's stock keeping unit (SKU), a universal product code (UPC), a universal archival network code (EAN), an international standard book numbering code (ISBN), a link to the merchant's web page for the item, or some other mechanism can be used that allows the broker 106 to be able the find the merchant/item. As another example, the identifier might be assigned by the broker 106 when the merchant 104 initially agrees to use the broker's 106 services for managing his/her transactions regarding the items that the merchant 104 is selling. When the broker 106 has received or otherwise identified the item(s) to be purchased, the broker 106 can continue with the checkout and payment process.

In still other embodiments, the customer 102 indicates to the broker 106 an interest in purchasing a particular type of item, and the broker 106 assists in finding the item. For example, the customer 102 might indicate to the broker 106 the name of the music CD that the customer 102 wishes to purchase, and the broker 106 can locate the music CD that is being sold by one or more merchants 104. The broker 106 can indicate that the item has been located and present to the customer 102 information about it (e.g., the price, shipping options, a list of merchants selling the item, and any combination of these, etc.). As another example, the broker 106 might provide a mechanism by which the customer 102 can use the broker 106 to locate the item (e.g., via a search engine associated with the broker 106 for searching various merchant's websites, a shopping service that presents a list of websites at which the item is sold, etc.).

In one embodiment, once the purchase request module 302 has received a request from a customer 102 to purchase one or more items, the broker 106 sells the item to the customer 102 for a particular price, and the broker 106 then accepts bids from one or more merchants to become the merchant 104 who actually provides the item and receives payment from the customer 102. In another embodiment, once the purchase request module 302 has received a request from a customer 102 to purchase one or more items, the broker 106 begins accepting bids from the one or more merchants in real time, before the broker 106 sells the item to the customer 102. These two embodiments (plus other embodiments) are described in more detail below.

The pricing module 310 can determine the defined price at which to offer the item(s) to the customer 102. In embodiments where the broker 106 sells the one or more items to the customer 102 before accepting bids from the merchants 104, this pricing of the item(s) to be sold to the customer 102 occurs before the item(s) are sold. In some embodiments, the module 310 sets the price of the item based on the price at which the merchant 104 is offering the item (e.g., on the merchant's website). In some embodiments, where more than one merchant 104 is offering the item for sale, the module 310 can set the price of the item based on the sale prices of the various merchants 104. For example, the module 310 could choose the highest price offered by the merchants 104, the lowest price, the median price, an average of the various prices offered, or use some other mechanism for setting the price. If module 310 offers a price to the customer 102 that is different from the price quoted by the merchant 104, the module 310 may need to take action in reconciling this pricing. Where the customer 102 is interested in purchasing a shopping cart full of items (possibly from different merchants), the pricing module 310 can determine a price for each of the items in the cart, and thus determine the overall price for purchasing the cart. In other embodiments, the broker 106 could set the price independently of what the merchants 104 are offering. For example, the module 310 might set the price according to what is determined to be a reasonable price for that item. As another example, once the broker 106 has sold a few items of that type, the pricing module 310 can collect data regarding the price that the customer 102 is typically willing to pay for that item, the price that the item is usually offered at, and so forth. This collected data can be used to determine what price the module 310 should set for the item. In some embodiments, the pricing module 310 can take into account one or more pricing factors when determining the price, such as the available shipping methods/costs, taxes, return policy, privacy policy, reliability of the merchants 104 offering the item, customer preferences 102, and so forth. For example, the customer 102 may indicate at the time of sale or may have indicated in advance preferences for certain merchants 104 or preferences for particular shipping times/costs, etc., and this may affect the pricing module's 310 price for the item. As another example, the customer 102 may have indicated an interest in purchasing the item for the cheapest price, even if the item is used. Other pricing factors taken into account can include, as explained above, one or more prices offered by the one or more merchants, determination of a reasonable price for the item independent of the one or more prices offered by the one or more merchants, data collected by the pricing module 310 regarding pricing information, and so forth. Thus, the pricing module 310 might modify its pricing structure to account for this preference.

In some embodiments, the price quoted to the customer 102 may or may not include shipping, taxes, and other fees. If the price quoted to the customer includes shipping, taxes, etc., then the broker 106 must consider how these prices will affect the price quote. For example, where an item is being shipped from out of state, the shipping cost might be greater, but possible the tax cost less. The broker 106 can also charge various transaction fees to the merchant (and/or the customer), and the broker 106 may charge different fees to different merchants based on a contractual obligation. In addition, the broker 106 might accept coupons that affect the price (e.g., coupons provided by a customer 102 to lower the price), might offer an instant rebate to the merchant(s) 104, etc., each of which can affect the pricing, as described more below.

In other embodiments where the customer 102 has selected the item from the website of a particular merchant 104, and the customer 102 was directed to the broker 106 for checkout and payment, the price set by the pricing module 310 is the price set by that particular merchant 104. However, in some embodiments, the broker 106 can indicate to the customer 102 that the item is available from other merchants 104, as well. For example, the broker 106 might provide a list of merchants 104 that are selling the item at a lower price, that are selling a higher quality version of the item, that provide cheaper or free shipping, that can ship the item faster, that do not charge taxes, that have a favorable return policy, that have a reasonable privacy policy, and so forth. The customer 102 can opt to consider these other merchants, or the customer can opt to purchase the item from the original merchant 104 from whom the item was initially identified by the customer 102. In some embodiments, the merchants 104 using the system described herein can choose to opt out of having the broker 106 provide competing bids to their customers.

In some embodiments, the transaction module 304 sells the item(s) to the customer 102. As described above, in some embodiments, the broker 106 sells the item to the customer 102 before accepting bids from the merchants 104. In these embodiments, the transaction module sells the item(s) to the customer for the defined price (e.g., the customer charged price, as determined by the pricing module 310). The defined price or customer charged price is the actual price that is charged to the customer or the price that shows up on the customer's receipt, including taxes, shipping charges, etc., where applicable. This sale can occur before the broker 106 has even identified which merchant 104 will be chosen to sell the item to the customer 102. Thus, the broker 106 may have only determined a list of merchants 104 offering the item for sale at this point. In some embodiments, the transaction module 304 allows the customer 102 to specify the methods of payment and shipping, shipping deadlines, etc., along with any other details that are necessary and/or desired for the transaction.

In some embodiments, the bid management module 306 accepts one or more bids from one or more merchants 104 to sell the item(s) to the customer 102, wherein the one or more merchants 104 offer the item for one or more prices. For example, each merchant 104 offering the item for sale can bid a certain merchant bid price at which the merchant 104 is willing to sell the item to the customer 102. In some embodiments, the merchants 104 can each offer multiple bids. In some embodiments, a first merchant 104 making a bid can later offer a lower merchant bid price if the first merchant 104 determines that a second merchant 104 has offered the item at a lower price.

As described above, in some embodiments, the broker 106 has already sold the item to the customer 102 before accepting bids. In these embodiments, the item has already been purchased by the customer 102 for the defined price, and the broker 106 has already accepted payment of that defined price from the customer 102. Thus, the broker 106 has a motivation to but does not have to accept a bid that is equal to or below that defined price.

In some embodiments, a merchant selection module 308 selects a chosen merchant out of the one or more merchants 104 to sell the item to the customer 102. In embodiments in which the broker 106 has already sold the item to the customer 102 for a defined price before accepting bids, the merchant selection module 308 can now select out of the group of merchants 104 that offered bids, the merchant 104 who will actually provide the item to the customer 102 and receive payment.

The module 308 can select the merchant 104 based on one or more criteria. For example, the broker 106 might select the merchant 104 who is selling the item for the cheapest price, who is selling the highest quality item, who has the best return policy (or has a reasonable return policy), who has a reasonable privacy policy, who has been the most reliable in the past (based on the broker's 106 own experience, based on reviews of the merchant 104, based on data collected by the broker 106, etc.), who can ship the item the quickest, who charges the least for shipping/taxes, etc., who the customer 102 prefers (e.g., the customer 102 can identify preferred merchants either in advance or at the time of purchase), and other criteria or any combination of these criteria. If the customer 102 has indicated to the broker 106 particular restrictions on the purchase (e.g., a required ship-by date, a required shipping method, a maximum price the customer 102 will pay for the item and/or shipping and/or taxes, a requirement for only new items and not used items, a preference for certain types of merchants 104, and so forth), the broker 106 can take those into account, as well. For example, the customer 102 might require that the item be shipped within a week. Thus, the bid management module 306 may only accept bids from merchants 104 that can ship the item within a week. Alternatively, the module 306 might accept bids from all merchants 104 selling the item, but the merchant selection module 308 may only select a merchant 104 that guarantees that he/she can ship the item within a week. The module 308 can also use a combination of some or all of the criteria described above, or other criteria, or might use a specific algorithm for determining how to select the merchant 104 to sell the item.

In embodiments in which the transaction module 304 has already sold the item to the customer 102 for a defined price, the merchant selection module 308 might only be willing to select a merchant 104 who will sell the item to the customer 102 for that defined price or less. If the chosen merchant 104 is offering the item for a merchant bid price that is lower than the defined price (price for which the transaction module 304 already sold the item to the customer 102), the broker 106 determines how to resolve this situation. For example, the broker 106 can decide to transfer only a portion of the defined price (customer charged price) to the merchant 104 (e.g., only pay the merchant 104 the price that was bid, even if the customer 102 paid the broker 106 more). In this case, the price that the merchant is paid (merchant paid price, or the price appears as the item price in the merchant receipt and the price that the broker 106 pays to the merchant in the transaction) is less than the defined price (customer charged price). As another example, the broker 102 can split the extra cost paid by the customer 102 with the merchant 104 (so the merchant 104 receives more than his merchant bid price, and the broker 106 also makes a profit on the sale). As still another example, the broker 106 could offer some of the extra money back to the customer 102 (e.g., via an instant credit or other mechanism).

As described above, in other embodiments, the bid management module 306 accepts bids in real time from one or more merchants for selling the item to the customer, wherein the one or more merchants offer the item for one or more prices. In these embodiments, the broker 106 accepts bids after initially receiving the request from the customer 102 to purchase the one or more items. Before the sale is completed, the module 306 accepts bids from merchants 104 interested in selling the item to the customer 102. In these embodiments, the price of the item has not yet been necessarily set, but instead the price can be determined by the bids received from the various merchants.

Again, the merchant selection module 308 selects a chosen merchant out of the one or more merchants to sell the item to the customer. The chosen merchant offers a selling price for the item. The broker 106 can use any one or more of the criteria described above for selecting the chosen merchant 104. Since the broker 106 has not already sold the item to the customer 102, the broker 106 has more flexibility regarding selection of merchants 104 offering different prices.

In these embodiments in which real-time bids were collected, the pricing module 310 quotes to the customer 102 a quoted price for purchasing the item from the chosen merchant 104. The pricing module 310 can consider many of the factors described above when setting the quoted price. In some embodiments, the module 310 offers a quoted price that is equal to the selling price (merchant bid price) bid by the chosen merchant 104. If the customer 102 agrees to pay the quoted price, then the final price charged to the customer (customer charged price) by the broker 106 might be equal to merchant bid price, which might also be equal to the final price paid to the merchant (merchant paid price).

In some embodiments, the module 310 offers a quoted price that is different from the selling price (merchant bid price) bid by the chosen merchant 104. For example, the broker 106 might choose to offer a quoted price to the customer 102 that is higher than the selling price offered by the chosen merchant 104. In these embodiments, if the customer 102 agrees to pay the quoted price, the broker 106 can make extra money on the transaction. In this case, the price charged to the customer (customer charged price) might be greater than the price paid to the merchant (merchant paid price). The broker 106 can decide to keep this extra money, treat this extra money as a fee charged for the transaction, etc. In some embodiments, the broker 106 can split the extra money with the merchant 104 (e.g., provide more money to the merchant than bid). Thus, in some embodiments, the broker 106 provides to the merchant 104 a better or higher price than what the merchant bid so that the merchant paid price exceeds the merchant bid price. The broker 106 could also give the merchant only the lower price that he bid (merchant bid price), but then reduce/remove any transaction fees charged to the merchant 104, apply an instant credit to the transaction for the merchant 104, or use another mechanism to provide payment above the merchant bid price.

In another example, the broker 106 might choose to offer a quoted price to the customer 102 that is less than the selling price offered by the chosen merchant 104. If the customer 102 agrees to pay this quoted price, the broker 106 might pay less to the merchant 104 than he bid, so the merchant paid price is less than the merchant bid price. In this case, the broker 106 might agree with the merchant 104 to pay the merchant the difference in a separate off-line transaction or otherwise resolve the difference. The broker 106 might instead pay more to the merchant 104 than the broker charged the customer 102 (e.g., pay the selling price or merchant bid price even though the customer did not agree to pay that much), so the merchant paid price exceeds the customer charged price. The broker 106 might do this in order to conduct the transaction with the customer even though the broker 106 will lose money in this transaction.

In some embodiments, the customer 102 has the option to refuse the price quoted by the pricing module 310 (e.g., if the customer 102 decides the price is too high and this is above the customer acceptable price). In these embodiments, the receiving module 312 receives indication from the customer 102 that he is not willing to pay the quoted price. The broker 106 can resolve this situation in a number of ways. For example, the pricing module 310 can ask the chosen merchant 104 to present a lower price that can then be quoted to the customer 102. As another example, the bid management module 306 can begin accepting more bids from merchants 104, and the merchant selection module 308 can select a new chosen merchant 104 offering the item at a lower price. As still another example, the pricing module 310 can ask the customer 102 what the customer 102 is willing to pay for the item (e.g., what is the customer acceptable price), and the broker 106 can present this price to the chosen merchant 104 and/or to a group of merchants 104 selling the item to accept bids for that price or lower. If the pricing module 310 is unable to provide a satisfactory price that the customer 102 will accept, the transaction can be ended or the broker 106 might otherwise resolve the situation (e.g., by conducting the transaction at the customer's acceptable price even though this is lower than the merchant's selling price).

In some embodiments, the broker 106 first determines from the customer what price the customer is willing to pay for the item (customer acceptable price) and then lists that price as the quoted price for the item. If it turns out that the broker 106 receives bids that are lower than the customer acceptable price, the broker 106 can charge the customer 102 less than the customer acceptable price so the customer 102 pays below what he was willing to pay, the broker 106 could apply an instant rebate to the transaction for the difference, and so forth.

In some embodiments, the receiving module 312 receives indication from the customer 102 that the customer 102 has agreed to purchase the item at an agreed price. In some embodiments, the agreed price is equal to the most recent quoted price that was quoted by the pricing module 310 (but possibly lower than the quoted price that the pricing module 310 initially quoted to the customer 102, since the broker 106 may have since received one or more lower bids from the merchants 104). In some embodiments, the agreed price might be lower than the most recent quoted price. For example, the customer 102 might have requested a slightly lower price than was quoted. However, in the interest of making the sale and completing the transaction quickly, the broker 106 can agree to the customer's requested price and cover the extra cost to be paid to the chosen merchant 104 that the customer was unwilling to pay. The customer 102 might indicate agreement by selecting an "agree" or "accept price" button presented to the customer 102 by the broker 106. Once the price has been settled and positive indication received by the module 312, the transaction module 304 sells the item(s) to the customer 102 for the agreed price.

In some embodiments, the transaction completion module 314 completes the transaction between the chosen merchant 104 and the customer 102. In both embodiments in which the broker 106 accepts bids after selling the item and embodiments in which the bids are accepted in real time, the merchant 104 interfaces with the module 314 to electronically accept customer and/or payment information from the broker 106. The module 314 can supply the payment information to the merchant 104 and interact with the merchant 104 to effect the purchase on behalf of the customer 102, to coordinate shipping, to specify customer preferences, etc.

In some embodiments, the merchant 104 communicates with the broker 106 via the network 108. In one embodiment, merchant-broker communications are conducted using the web services description language (WSDL). In some embodiments, the merchant 104 uses XML-based remote procedure calls (RPCs) to provide information to the broker 106 and receive information in return. In other embodiments, the merchant 104 communicates with the broker 106 using other techniques and/or protocols, such as via email messages, HTML web pages intended for review by human users, proprietary communications protocols, etc.

III. Process/Example

Figure 4:
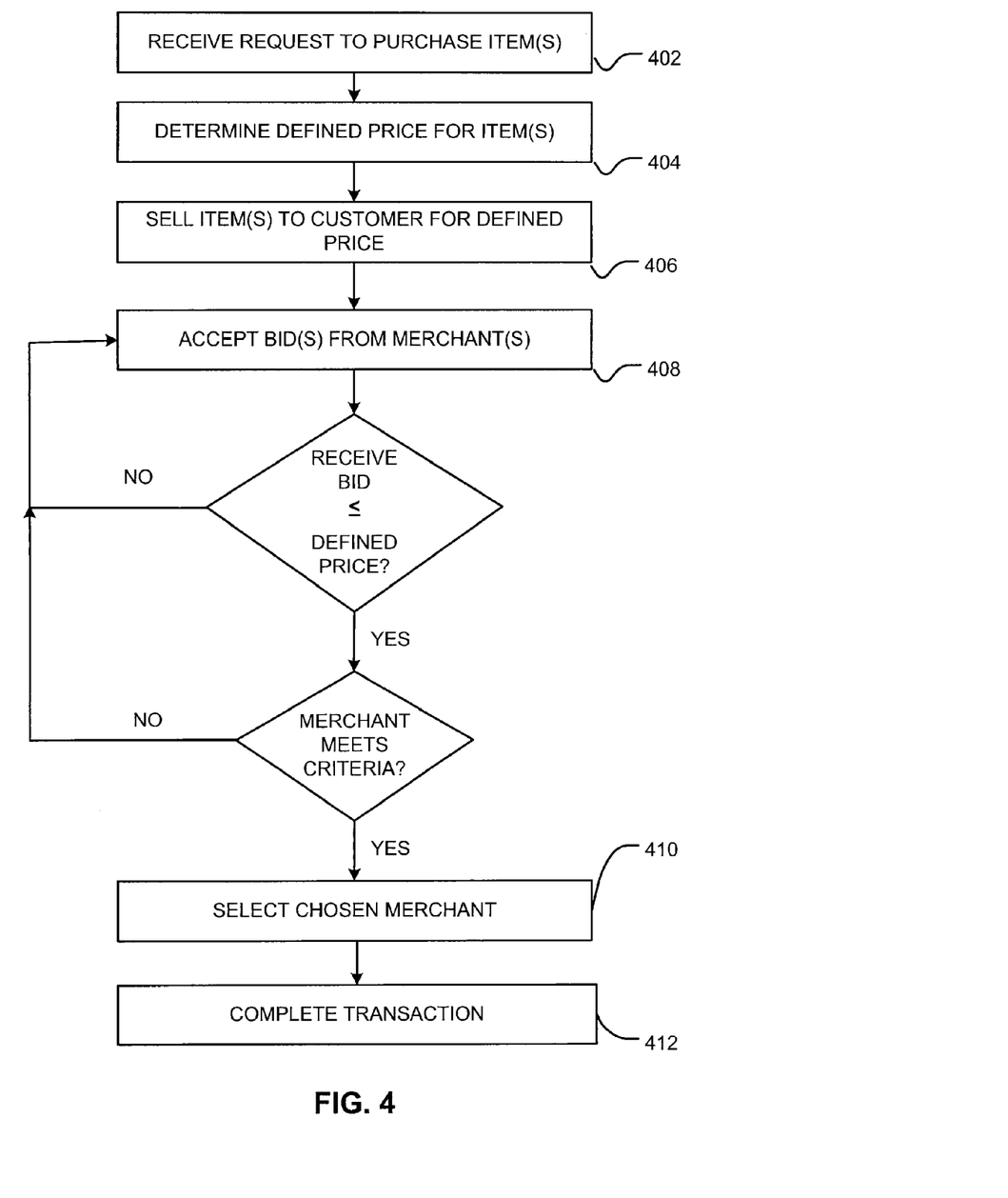
FIG. 4 is a flow chart illustrating the operation of the broker according to one embodiment in which the item is sold to the customer before bids are accepted.

FIG. 4 is a flow chart illustrating the operation of the broker 106 according to one embodiment. Those of skill in the art will recognize that other embodiments can perform the steps of FIG. 4 in different orders (the same is true of FIG. 5). Moreover, other embodiments can include different and/or additional steps than the ones described here (the same is true of FIG. 5).

FIG. 4 is a flow chart illustrating the operation of the broker 106 in an exemplary transaction where the broker 106 sells the item to the customer before accepting bids. In some embodiments, the broker 106 receives 402 a request to purchase one or more items. For example, the customer 102 can select one or more items from a merchant's website (or from the websites of multiple merchants 104) for purchase, or can select a shopping cart containing item(s) to be purchased (for example, where the cart is received via email, and the purchase is made without visiting the merchant website), and so forth. These one or more items can be sent to the broker 106 for the checkout/payment process, or the broker 106 can be provided with an identifier for or a link to the items, etc. In some embodiments, the customer 102 indicates to the broker 106 an interest in purchasing a particular type of item, and the broker 106 assists in finding the item, as described above.

In some embodiments, the broker 106 determines 404 the defined price at which to offer the item(s) to the customer 102. The broker can set the price of the item based on one or more criteria. In some embodiments, the broker 106 sets the price of the item based on the price at which the merchant 104 is offering the item, based on the sale prices of the various merchants 104 (e.g., highest price offered by the merchants 104, the lowest price, the median price, an average of the various prices offered, etc.), based on what is determined to be a reasonable price for that item, based on previously collected data regarding pricing for that item, a combination of these, and so forth. In some embodiments, the broker 106 considers available shipping methods/costs, taxes, reliability of the merchants 104 offering the item, customer preferences 102, a combination of these, and so forth.

In some embodiments, the broker 106 sells 406 the item(s) to the customer for the defined price. The broker 106 can also accept 408 bids from one or more merchants 104 to sell the item(s) to the customer 102, wherein the one or more merchants 104 offer the item for one or more prices. Since the broker 106 has already sold the item to the customer 102 at a defined price set by the broker 106, the broker 106 has a motivation to accept a bid that is equal to or below that defined price. Thus, the broker 106 can determine whether a bid received is less than or equal to the defined price. If not, the broker 106 can continue to accept 408 more bids.

If the broker 106 has received one or more bids that are less than or equal to the defined price, the broker 106 can also determine if the merchant meets certain criteria set by the broker 106 and/or the customer 102. This determination can also occur before or at the same time as the determination of whether the bid meets the defined price. For example, the broker 106 might consider the price of the item, quality of the item, reliability of the merchant, shipping time, shipping costs, taxes, customer preferences, customer restrictions on the transaction, and other criteria or any combination of these criteria. If the broker 106 determines that none of the merchants 104 meet the criteria, the broker 106 can accept 408 more bids until such merchant 104 is found or can make a compromise and select a merchant 104 that meets only some or most of the criteria. If the broker 106 determines that one or more merchants 104 meet the criteria (or meet at least some of the criteria), the broker 106 can select 410 a chosen merchant 104 out of the one or more merchants 104 to sell the item to the customer 102. Thus, the broker 106 selects 410 the merchant 104 who will actually provide the item to the customer 102 and who will receive payment. The broker 106 can then complete 412 the transaction. Thus, the broker 106 can work with the merchant 104 regarding provision of customer and/or payment information, coordination of shipping, etc.

Figure 5:
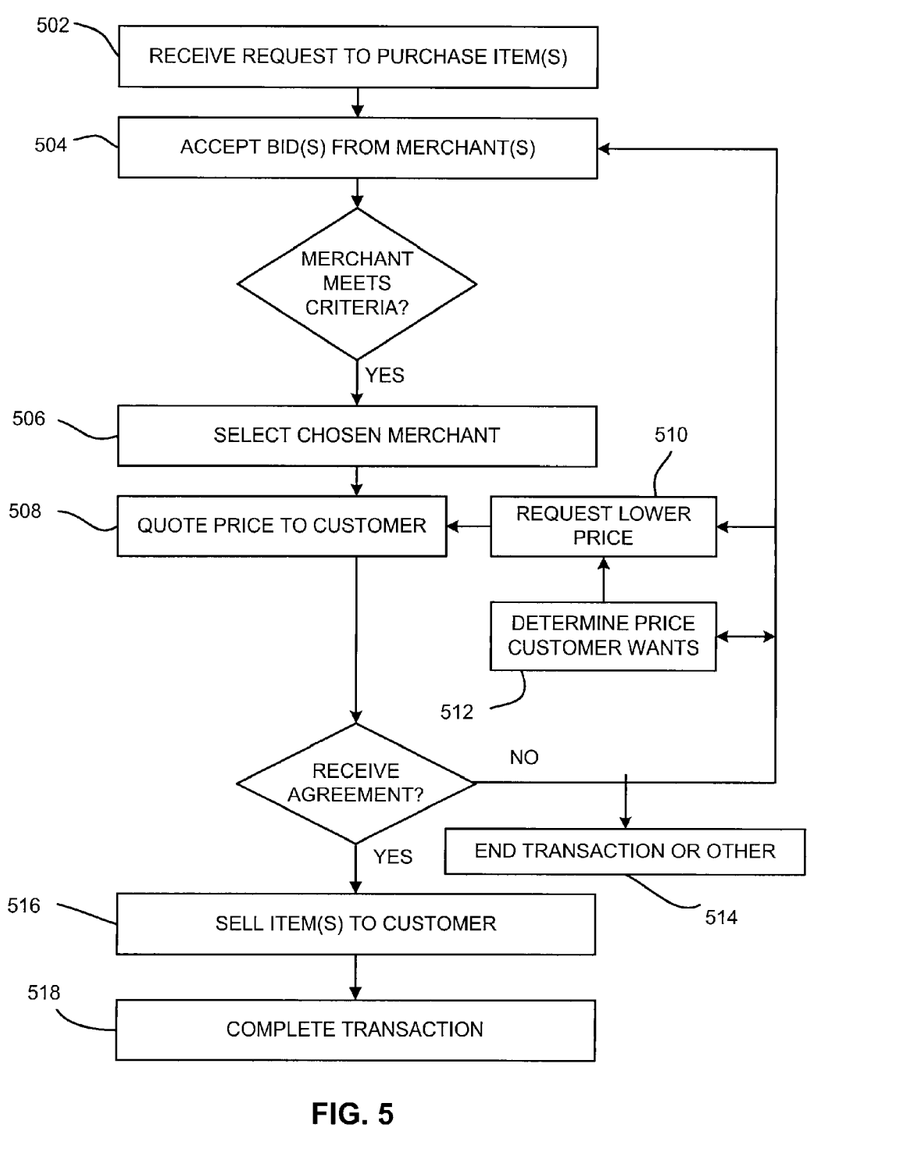
FIG. 5 is a flow chart illustrating the operation of the broker according to another embodiment in which bids are accepted in real time before the item is sold to the customer.

FIG. 5 is a flow chart illustrating the operation of the broker 106 in an exemplary transaction where the broker 106 sells the item to the customer 102 after accepting bids in real time. As in the embodiment of FIG. 4, the broker 106 receives 502 a request from a customer 102 to purchase one or more items. In some embodiments, the broker 106 accepts 504 bids in real time from one or more merchants to sell the item(s) to the customer 102, wherein the one or more merchants 104 offer the item for one or more prices. In these embodiments, the price of the item has not yet been necessarily set, but instead the price can be determined by the bids received from the various merchants 104.

The broker 106 can also determine if the merchant(s) 104 meet certain criteria set by the broker 106 and/or the customer 102, such as those described above. If the broker 106 determines that none of the merchants 104 meet the criteria, the broker 106 can accept 504 more bids until such merchant 104 is found or can make a compromise and select a merchant 104 that meets only some or most of the criteria. If the broker 106 determines that one or more merchants 104 meet the criteria (or meet at least some of the criteria), the broker 106 can select 506 a chosen merchant out of the one or more merchants 104 to sell the item to the customer 102. The chosen merchant 104 offers a selling price for the item. The broker 106 quotes 508 to the customer 102 a quoted price for purchasing the item from the chosen merchant 104. In some embodiments, the broker 106 offers a quoted price that is equal to the selling price bid by the chosen merchant 104. In some embodiments, the broker 106 offers a quoted price that is higher than the selling price bid by the chosen merchant 104, allowing the broker 106 (and the merchant 104, if the broker 106 shares with the merchant 104) to potentially make a profit on the transaction.

In some embodiments, the customer 102 has the option to refuse the price quoted by the broker 106. Thus, the broker 106 determines whether or not it has received agreement from the customer 102 to pay the price quoted by the broker 106. If the broker 106 has not received agreement, the broker 106 can take a number of possible actions. In some embodiments, the broker 106 can request 510 a lower price from the chosen merchant 104 that can then be quoted to the customer 102. In some embodiments, the broker 106 can begin accepting 504 more bids from merchants 104, and the broker 106 can select 506 a new chosen merchant 104 offering the item at a lower price. The broker 106 can then quote 508 this lower price to the customer 102. In some embodiments, the broker 106 can determine 512 the price that the customer 102 is willing to pay for the item (e.g., by asking the customer 102 what price is acceptable), and the broker 106 can request 510 this lower price from the chosen merchant 104 and/or from a group of merchants 104 selling the item to accept bids for that price or lower. If the broker 106 is unable to obtain a satisfactory price for the customer 102, transaction might end 514. It is also possible that the broker 106 takes some other action 514. For example, the broker 106 might instead decide to pay the difference between the prices (e.g., sell the item to the customer at the price the customer accepted or possibly offer an instant credit to the merchant) or offer the item to the customer for the higher merchant price (e.g., with an instant coupon for the difference), and so forth.

The broker 106 may receive an indication from the customer 102 that the customer has agreed to purchase the item at an agreed price (that might be equal to the selling price offered by the merchant, the initially quoted price quoted by the broker 106, a later quoted price quoted by the broker 106, etc.). The customer 102 might indicate agreement by selecting an "agree" or "accept price" button presented to the customer 102 by the broker 106. Once the price has been settled and positive indication received by the broker 106, the broker 106 can sell 516 the item(s) to the customer 102 for the agreed price. The broker 106 can then complete 518 the transaction, as described above regarding the embodiment of FIG. 4.

The broker 106 thus allows customers 102 to potentially purchase items for a lower price because the broker 106 accepts bids from a number of merchants 104, thus giving the customer 102 alternative prices without requiring the customer 102 to invest a lot of work to find the cheapest price. Using the broker 106 in this manner also provides security because it allows customers 102 to make purchases from one or more merchants 104 without providing the customers' personal data to the merchant(s) 104. Similarly, the merchants 104 obtain a benefit because the broker 106 takes care of the managing the transaction for the merchant 104. In addition, using the broker 106 allows merchants 104 to increase their sales by lowering their barriers to purchase and leveraging the reputation and trustworthiness of the broker 106. Finally, the broker 106 can also benefit since the broker 106 may obtain a portion of the cost of the transaction, thereby allowing the broker 106 to cover its transaction costs and potentially make some profit.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A method of conducting electronic commerce, the method comprising:
    receiving, by a broker computer system, a request from a customer to purchase an item;
    determining, by the broker computer system, a defined price at which to offer the item to the customer based on one or more pricing criteria;
    completing, by the broker computer system, a sale of the item to the customer for the defined price;
    responsive to completing the sale of the item to the customer, accepting, by the broker computer system, bids from a plurality of merchants selling the item, each bid indicating a price at which one of the plurality of merchants is willing to provide the item to the customer; and
    selecting, by the broker computer system from the plurality of merchants, a chosen merchant to provide the item to the customer, the chosen merchant selected based on one or more selection criteria.

2. The method of claim 1, wherein determining the defined price further comprises taking into account one or more pricing factors selected from a group consisting of: shipping methods, shipping costs, taxes, return policy, privacy policy, reliability of merchants offering the item, and customer preference.

3. The method of claim 1, wherein determining the defined price further comprises making the determination based on one or more prices offered by one or more merchants.

4. The method of claim 1, wherein determining the defined price further comprises determining a reasonable price for the item independent of the prices at which the plurality of merchants are willing to provide the item.

5. The method of claim 1, wherein receiving a request further comprises the customer selecting the item displayed on a merchant's website and being transferred to the broker computer system for management of a transaction associated with the item.

6. The method of claim 1, wherein the one or more selection criteria are selected from a group consisting of: price of the item, quality of the item, reliability of merchant, shipping time, shipping costs, return policy, privacy policy, taxes, shipping methods, agreed-upon merchant fees, and customer preference.

7. The method of claim 1, wherein the chosen merchant is selected responsive to the bid of the chosen merchant satisfying a purchase restriction indicated by the customer.

8. The method of claim 7, wherein the purchase restriction indicated by the customer is a date by which the items must be shipped.

9. The method of claim 7, wherein the purchase restriction indicated by the customer is that the item be provided by one merchant from a set of merchants.

10. The method of claim 7, wherein the purchase restriction indicated by the customer is that the item be shipped using a selected shipping method.

11. The method of claim 1, wherein bids are accepted from merchants satisfying a purchase restriction indicated by the customer.

12. The method of claim 1, wherein the defined price is determined based on prices for which the item has been sold in the past to other customers.

13. The method of claim 1, wherein selecting the chosen merchant further comprises selecting the chosen merchant offering to provide the item to the customer for less than the defined price.

14. The method of claim 1, wherein selecting the chosen merchant further comprises selecting the chosen merchant offering to provide the item to the customer for the defined price.

15. The method of claim 1, further comprising completing a payment transaction by providing payment to the chosen merchant at the price bid by the chosen merchant.

16. The method of claim 1, further comprising completing a payment transaction by providing payment to the chosen merchant of an amount determined based on the defined price at which the item was sold to the customer and the price bid by the chosen merchant.

17. A computer system comprising:
a computer processor; and
a non-transitory computer-readable storage medium storing computer program modules configured to execute on the computer processor, the computer program modules comprising:
  a purchase request module for receiving a request from a customer to purchase an item;
  a pricing module for determining the defined price at which to offer the item to the customer based on one or more pricing criteria;
  a transaction module for completing a sale of the item to the customer for a defined price;
  a bid management module for, responsive to completing the sale of the item to the customer, accepting bids from a plurality of merchants selling the item, each bid indicating a price at which one of the plurality of merchants is willing to provide the item to the customer; and
  a merchant selection module for selecting, from the plurality of merchants, a chosen merchant to provide the item to the customer, the chosen merchant selected based on one or more selection criteria.

18. The system of claim 17, wherein determining the defined price further comprises taking into account one or more pricing factors selected from a group consisting of: shipping methods, shipping costs, taxes, return policy, privacy policy, reliability of merchants offering the item, and customer preference.

19. The system of claim 17, wherein the pricing module is further adapted to make the determination based on the one or more prices offered by the one or more merchants.

20. The system of claim 17, wherein the pricing module is further adapted to determine a reasonable price for the item independent of the prices at which the plurality of merchants are willing to provide the item.

21. The system of claim 17, the purchase request module is further adapted to receive a request when the customer selects the item displayed on a merchant's website and is transferred to the electronic commerce system for management of a transaction associated with the item.

22. The system of claim 17, wherein the one or more selection criteria are selected from a group consisting of: price of the item, quality of the item, reliability of merchant, shipping time, shipping costs, refund policy, privacy policy, taxes, shipping methods, agreed-upon merchant fees, and customer preference.

23. The system of claim 17, wherein the chosen merchant is selected responsive to the bid of the chosen merchant satisfying a purchase restriction indicated by the customer.

24. The system of claim 17, wherein the merchant selection module is further adapted to select the chosen merchant offering to provide the item to the customer for less than the defined price.

25. The system of claim 17, wherein the merchant selection module is further adapted to select the chosen merchant offering to provide the item to the customer for the defined price.

26. The system of claim 25, further comprising a transaction completion module for completing a transaction by managing payment to the chosen merchant for the defined price.

* * * * *